United States Patent [19]
Gotou et al.

[11] Patent Number: 5,390,555
[45] Date of Patent: Feb. 21, 1995

[54] COAXIAL STARTING MOTOR

[75] Inventors: Takeo Gotou; Shuzo Isozumi, both of Himeji, Japan

[73] Assignee: Mitsubishi Denki Kabushiki Kaisha, Tokyo, Japan

[21] Appl. No.: 67,030

[22] Filed: May 26, 1993

[30] Foreign Application Priority Data

May 29, 1992 [JP] Japan ............... 4-163804

[51] Int. Cl.⁶ ............................................. F02N 11/00
[52] U.S. Cl. ............................................ 74/7 R; 74/7 A; 290/38 A; 290/38 C
[58] Field of Search ............. 74/7 R, 7 A; 290/38 R, 290/38 A, 38 C

[56] References Cited

U.S. PATENT DOCUMENTS

| | | | |
|---|---|---|---|
| 4,816,712 | 3/1989 | Tanaka | 310/80 |
| 4,881,416 | 11/1989 | Isozumi | 74/7 A X |
| 4,978,874 | 12/1990 | Isozumi et al. | 310/71 |
| 5,097,715 | 3/1992 | Isozumi | . |
| 5,111,093 | 5/1992 | Tanaka | 74/7 A |
| 5,307,700 | 5/1994 | Spellman et al. | 74/7 A |
| 5,307,702 | 5/1994 | Spellman et al. | 74/7 A |

FOREIGN PATENT DOCUMENTS

| | | | |
|---|---|---|---|
| 90666 | 4/1988 | Japan | 74/7 A X |
| 192573 | of 1989 | Japan | . |
| 223671 | 6/1990 | Japan | 74/7 A |

*Primary Examiner*—Edward K. Look
*Assistant Examiner*—Michael S. Lee
*Attorney, Agent, or Firm*—Sughrue, Mion, Zinn, Macpeak & Seas

[57] ABSTRACT

A coaxial starting motor comprises a d.c. motor whose armature has a hollow rotary shaft projected at its end forwardly, and which has a rear end provided with an electromagnetic switch which is arranged to be coaxial therewith, and which has a movable core attracted by a fixed core on energizing an exciting coil to forwardly move a movable rod with the movable core and causing a movable contact supported by the movable rod to get in touch with a fixed contact wherein the electromagnetic switch has a fixed core partitioning a contact chamber and a movable core chamber so as to prevent contact powder from entering the movable core chamber and hamper the sliding motion of the movable core.

2 Claims, 2 Drawing Sheets

COAXIAL STARTING MOTOR

BACKGROUND OF THE INVENTION

1. Field of the Invention

The present invention relates to a coaxial starting motor which has an electromagnetic switch mounted at its rear end.

2. Discussion of Background

Referring to FIG. 2, there is shown an axial cross sectional view of a conventional coaxial starting motor, which has been disclosed in e.g. Japanese Unexamined Patent Publication No. 92573/1989. In FIG. 2, reference numeral 1 designates a d.c. motor which is constructed as follows: Field poles 2 which are made of e.g. a permanent magnet are attached to a yoke 3. Reference numeral 4 designates an armature wherein an armature core 5 with armature windings 6 wound thereon, and commutators 8 are fixed on a hollow rotary shaft 7. Reference numeral 9 designates a front bracket, which is coupled together with the yoke 3, a rear bracket 10 and a casing 41 by means of through bolts 11. Reference numeral 12 designates a brush holder which is attached to the yoke 3, and which presses brushes 13 against the commutators 8. The rotary shaft 7 is supported by a bearing 14 held in a bearing supporting portion 3a formed integrally with the yoke 3, and a bearing 15 held in the rear bracket 10.

Reference numeral 17 designates a planetary reduction gear which is constructed as follows: Reference numeral 18 designates a sun gear which is constructed by a pinion formed on a front end portion of the rotary shaft 7. Reference numeral 19 designates a plurality of planetary gears which mate with the sun gear 18, and which are supported by supporting pins 20 through bearings 21. The supporting pins 20 are fixed to a clutch outer 25 which also works as a carrier. Reference numeral 22 designates an internal gear which is formed on an inner periphery of a front end portion of the yoke 3, and which causes the planetary gears 19 mating therewith to revolve.

Reference numeral 24 designates an overrunning clutch which is constructed by the clutch outer 25, a clutch inner 26 and a bearing 28, the clutch inner 26 transmitting one-direction rotation to the clutch outer 25 through rollers 27. The clutch inner 26 is supported by the front bracket 9 through a bearing 29. Reference numeral 30 designates an output shaft which is coupled with helical spline grooves 26a of the clutch inner 26 at its helical spline portion 30a, and which has a rear end side supported in the rotary shaft 7 through a bearing 31. Reference numeral 33 designates a return spring which works to retract and return the output shaft 30. Reference numeral 34 designates a pinion which is carried on a front end portion of the output shaft 30 by spline connection, and which is received by a stopper 35. Reference numeral 36 designates a buffer spring which urges the pinion 34.

Reference numeral 40 designates an electromagnetic switch which is mounted to a rear end of the d.c. motor 1 to be coaxial therewith, and which is constructed as follows: A casing 41 which forms a magnetic path has a fixed core 42 and a magnetic path core 43 fixed thereto. Reference numeral 44 designates an exciting coil which is wound on a bobbin 45. Reference numeral 46 designates an end cover which is made of a non-magnetic material. Reference numeral 47 designates a movable core which forms a plunger, and which is movably guided, in an axial direction, by a guide sleeve 48 fixed to the magnetic path core 43 and the fixed core 42. Reference numeral 49 designates a movable rod which is made of a tube of a non-magnetical material, and which has the movable core 47 fixed at a rear end. Reference numeral 50 designates a movable contact which is supported by the movable rod 49 through an insulating supporter 51, and which is urged by a pressing spring 52. Reference numeral 53 designates a pushing rod which has a rear end portion supported to be movable in the rod 49 in an axial direction, and which has a front end pushed against a bore bottom in a rear end of the output shaft 30 through a steel ball 54. Reference numeral 55 designates a receiving member which is fixed in the rear end of the movable rod 49. Reference numeral 56 designates a return spring for the movable rod 49. Reference numerals 57 and 58 designate compression springs. Reference numeral 59 designates an insulating holder which is fixed to the rear bracket 10, and which is molded from synthetic resin. Reference numeral 60 designates a pair of fixed contacts which are embedded in the insulating holder 59. Reference numeral 61 designates a terminal bolt for connecting to a power source, which is made integrally with one of the fixed contacts 60, and which projects outwardly.

In the conventional starting motor stated earlier, when a vehicle starting switch is closed, the exciting coil 44 is energized. The movable core 47 moves forwardly by magnetic attraction to push the movable rod 49, causing the output shaft 30 to travel forwardly through the pushing rod 53. As a result, the pinion 34 gets into mesh with an engine ring gear. In addition, the movable contact 50 gets in touch with the paired fixed contact 60 to energize the electrical circuit of the d.c. motor 1, causing the armature 4 to rotate. The rotation of the rotary shaft 7 given by the armature 4 is transmitted to the output shaft 30 through the planetary reduction gear 17 and the overrunning clutch 24 to start an engine by the pinion 34. When the engine has started and the starting switch is opened, the output shaft 30 is retracted by the return spring 33, and the movable rod 49 is also retracted by the return spring 56, causing the movable contact 50 to separate from the fixed contacts to break the energization of the d.c. motor 1.

The conventional coaxial starting motor as stated earlier involves a problem in that the arrangement wherein the movable contact 50 and the fixed contacts 60 of the electromagnetic switch 40 are positioned in a displacement chamber of the movable core 47 allows contact powder to adhere on a sliding surface of the periphery of the movable core 47 to obstruct the sliding movement of the movable core. The conventional coaxial starting motor also has a problem in that the presence of a gap between the movable core 47 and the guide sleeve 48 permits the movable rod 49 to incline, causing the movable rod 49 to get in touch with the internal wall of the hollow space of the rotary shaft 7 in some instances. There is a possibility that when the movable rod 49 rotates depending on the rotary shaft 7, the movable contact 50 could rotate or separate from the fixed contacts 60.

SUMMARY OF THE INVENTION

It is an object of the present invention to solve the first problem and to provide a coaxial starting motor which is free from the obstruction in sliding movement of a movable core by preventing contact powder from adhering on the sliding surface of the movable core.

It is another object to solve the second problem in addition to the first problem and to provide a coaxial starting motor capable of preventing a closed movable contact from rotating and from separating from fixed contacts even if a movable rod with a movable core fixed thereto inclines.

The foregoing and other objects of the present invention have been attained by providing a coaxial starting motor comprising a d.c. motor whose armature has a hollow rotary shaft projected at its end forwardly, and which has a rear end provided with a brush holder; an overrunning clutch for transmitting rotation from the rotary shaft; an output shaft whose rear end portion is positioned in the rotary shaft, which is supported so as to be movable forwardly and backwardly, and which is transmitting the rotation by the overrunning clutch; a pinion fixed on a front end portion of the output shaft; and an electromagnetic switch which is arranged behind the d.c. motor to be coaxial therewith, and which has a movable core attracted by a fixed core on energizing an exciting coil to forwardly move a movable rod with the movable core fixed at its rear end, thereby forwardly moving the output shaft through a pushing rod and causing a movable contact supported by the movable rod to get in touch with a fixed contact From the back to rotate the armature; wherein the electromagnetic switch has the fixed contact and the movable contact arranged at an inner peripheral side of a brush holder and has the fixed core partitioning a contact chamber and a movable core chamber, the movable core chamber located behind the contact chamber.

In accordance with the present invention, even if the opening and closing operation between the movable contact and the fixed contacts causes contact powder to scatter, the arrangement wherein the contact chamber and the movable core chamber are partitioned by the fixed core prevents the contact powder from adhering on the movable core, allowing the movable core to be slided smoothly.

It is preferable that the movable rod has an outer periphery at its front end side faced to an inner peripheral portion of a rear bracket of the a d.c. motor, the movable rod has a holding sleeve supported on its outer periphery to be movable, the movable contact is supported by the holding sleeve in an insulating manner, and the movable contact is urged by a pressing spring in a contacting direction.

In accordance with the preferred form, even if the movable rod inclines, the movable rod can be prevented from rotating in contact with the inner periphery of the rotary shaft, avoiding poor contact of the movable contact to the fixed contacts. In addition, even if the movable rod inclines, the movable contact can maintain the contact to the fixed contacts securely.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
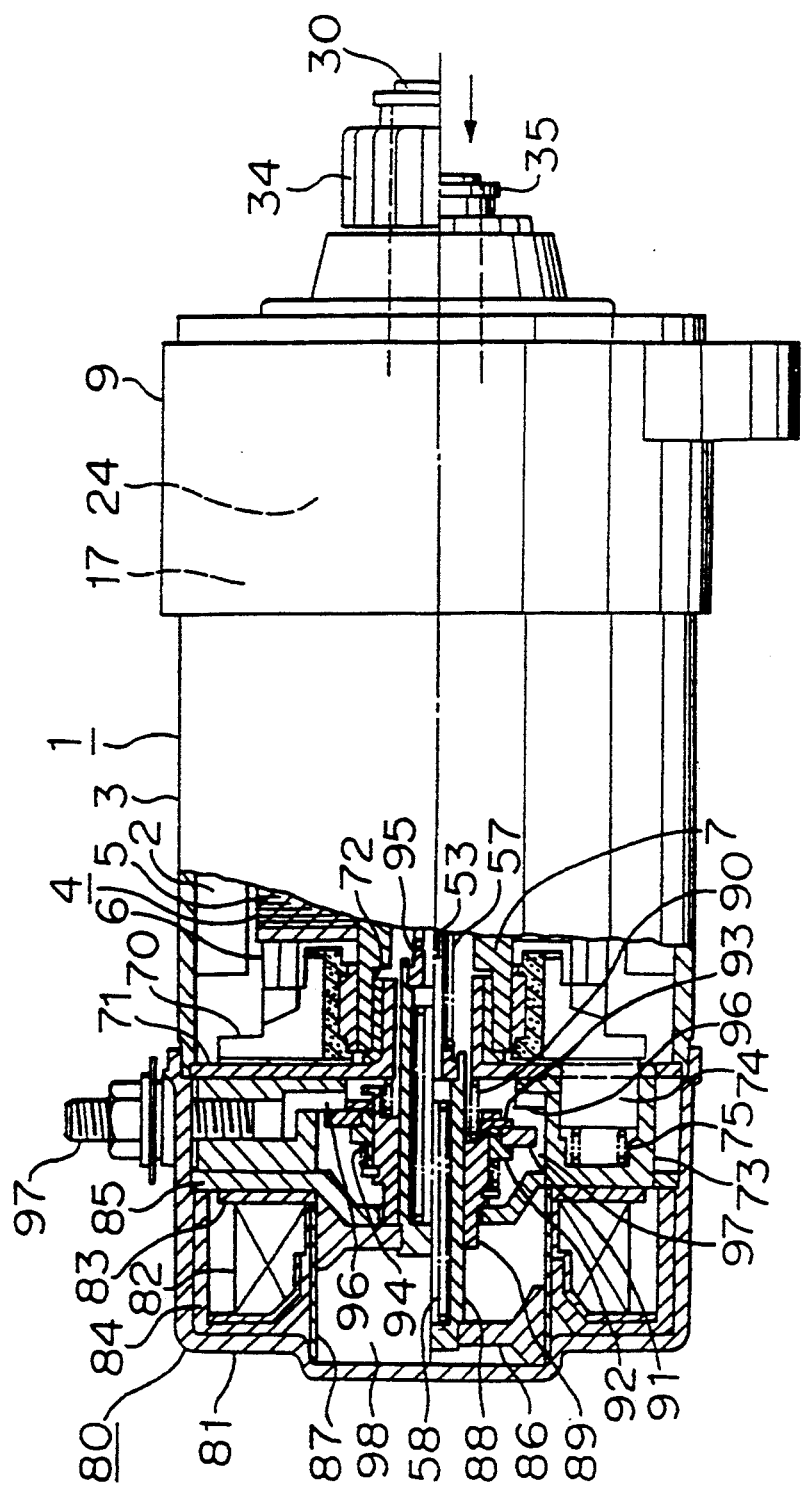
FIG. 1 is a front view of an embodiment of the coaxial starting motor according to the present invention, the rear half portion being shown in section.

Referring now to FIG. 1, there is shown a front view of a typical example of the coaxial starting motor according to the present invention. The parts indicated by reference numerals 1-7, 9, 17, 24, 30, 34, 35, 53, 57 and 58 are identical or similar to those shown in FIG. 2. The output shaft 30, the pinion 34, a movable core, a movable rod and a movable contact are shown to be in a forward position in an upper half portion of FIG. 1 and to be in a backward or retracting position in a lower half portion. In FIG. 1, reference numeral 70 designates a disk-shaped commutator which is mounted on the hollow rotary shaft 7. Reference numeral 71 designates a rear bracket which is fixed to the yoke 3, and supports the rotary shaft 7 at its rear end portion through a bearing 72. Reference numeral 73 designates a brush holder which is attached to the rear bracket and which is formed from synthetic resin and which uses a brush spring 75 to urge a brush 74 against a contacting surface of the commutator 70 in an axial direction.

Figure 2:
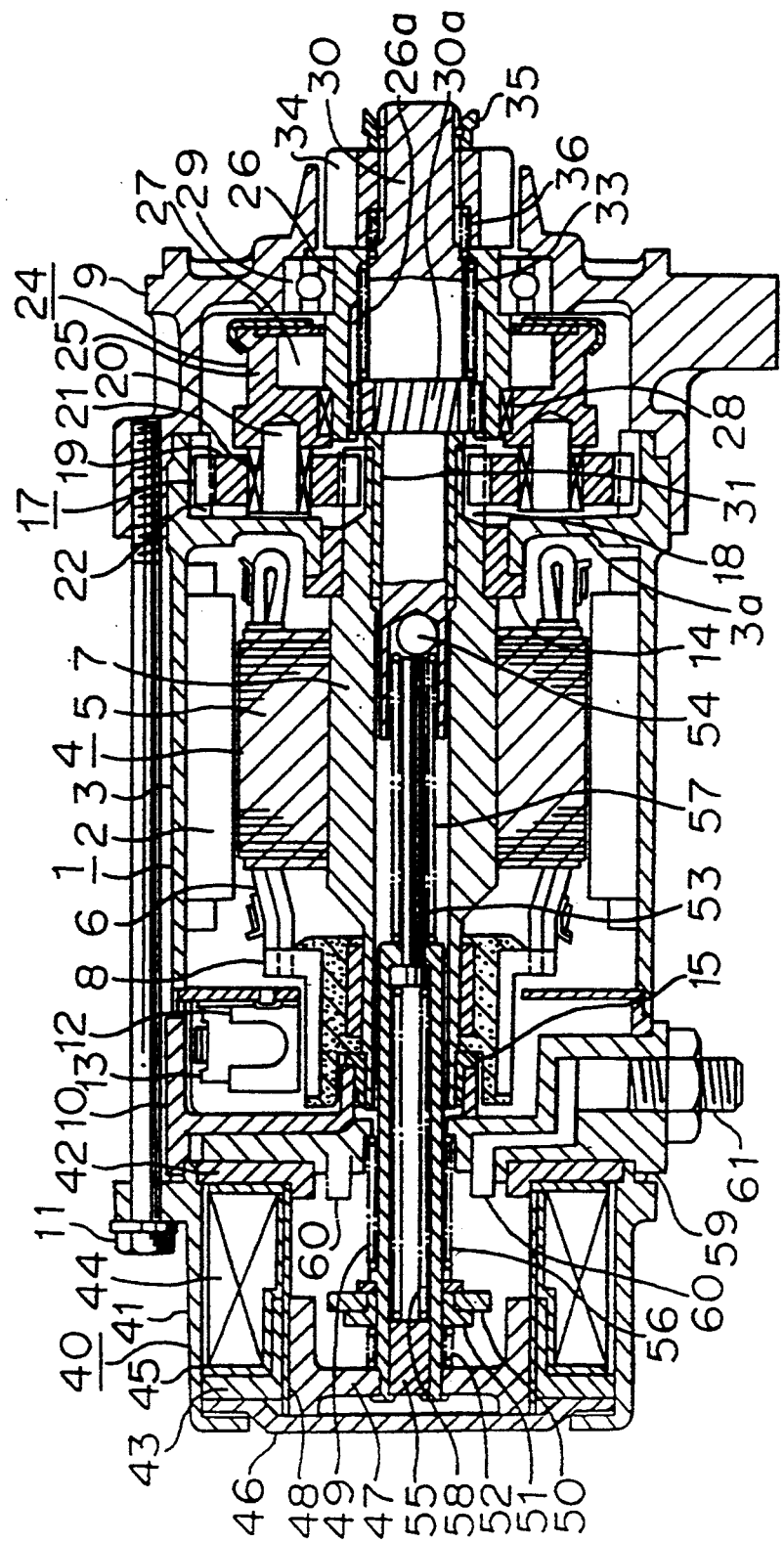
FIG. 2 is an axial cross sectional view of a conventional coaxial starting motor.

Reference numeral 80 designates an electromagnetic switch which is arranged at a rear end of the d.c. motor 1 to be coaxial therewith, and which is constructed as follows: Reference numeral 81 designates an enclosure which is coupled with the rear bracket 9 by a through bolt (not shown) through the yoke 3. Reference numeral 82 designates an exciting coil which is wound on a bobbin 83. Reference numeral 84 designates a casing which is made of a magnetic material to form a magnetic path. Reference numeral 85 designates a fixed core which is fixed to the casing. Reference numeral 86 designates the movable core which forms a plunger and which is movably guided, in an axial direction, by a guide sleeve 87 fixed to an inner periphery of the casing 84. Reference numeral 88 designates the movable rod which has a rear end provided fixedly with the movable core 86 and which is made of a non-magnetic material. Reference numeral 89 designates a holding sleeve which is fitted on the movable rod with a small gap, which is supported to be movable in an axial direction, and which is urged backwardly by a return spring 90. Reference numeral 91 designates the movable contact which is supported by the holding sleeve 89 through an insulating supporter 92, and which is urged by a pressing spring 94. Reference numeral 93 designates an insulating plate. The pushing rod 53 has a rear end portion supported to be movable by the movable rod 88 in an axial direction, and which is received by a receiver 95 fixed in a front end portion of the movable rod 88. The pushing rod 53 has the leading edge faced to the rear end of the output shaft 30 through a steel ball 54 as shown in FIG. 2, and is urged by the compression spring 58 in a forward direction. The movable rod 88 is urged by the compression spring 57 in a backward direction. Reference numeral 96 designates a pair of fixed contacts which are embedded in the brush holder 73. One of the fixed contacts 96 has a terminal bolt 97 formed integrally therewith to extend outwardly for connection with a wire from a power source. The other fixed contact 96 is connected to a brush side of the power source.

In this embodiment, when a vehicle starting switch is closed, the exciting coil 82 is energized. The movable core 86 is magnetically attracted by the fixed core 85, causing the movable rod 88 to move forwardly depending on the movable core 86. As a result, the output shaft 30 is pushed forwardly through the pushing rod 53, and the pinion 34 gets into mesh with a ring gear. In addition, when the movable contact 91 gets in touch with the paired fixed contacts 96 to close an electric circuit of the d.c. motor 1, the armature 4 is rotated, and rotation of the rotary shaft 7 is transmitted to the output shaft 30 through the planetary reduction gear 17 and the overrunning clutch 24 to start a vehicle engine through the pinion 34.

A contact chamber 97 where the movable contact 91 and the fixed contacts 96 are arranged, and a movable core chamber 98 where the movable core 86 is arranged are partitioned by the fixed core 85 to prevent contact powder scattered in the contact chamber 97 from entering the movable core chamber 98. In addition, even if the presence of a gap between the movable core 86 and the guide sleeve 87 allows the movable rod 88 to incline, the movable rod 88 can be prevented from rotating depending on the rotation of the rotary shaft 7 unlike the conventional starting motor because the movable rod 88 has the outer periphery of the leading edge portion in touch with the inner periphery of the rear bracket. Even if the movable rod 88 inclines in a state where the movable contact 91 has moved forwardly and is in press-touch with the fixed contacts 96, the movable contact 91 which is urged by the pressing spring 94 can maintain contact with the paired fixed contacts 96 because there is the small gap between the holding sleeve 89 and the movable rod 88.

Obviously, numerous modifications and variations of the present invention are possible in light of the above teachings. It is therefore to be understood that within the scope of the appended claims, the invention may be practiced otherwise than as specifically described herein.

What is claimed is:

1. A coaxial starting motor comprising:

a d.c. motor whose armature has a hollow rotary shaft projected at its end forwardly, and which has a rear end provided with a brush holder;

an overrunning clutch for transmitting rotation from the rotary shaft;

an output shaft whose rear end portion is positioned in the rotary shaft, which is supported so as to be movable forwardly and backwardly, and which is rotated by the overrunning clutch;

a pinion fixed on a front end portion of the output shaft; and an electromagnetic switch which is arranged behind the d.c. motor to be coaxial therewith, and which has a movable core attracted by a fixed core on energizing an exciting coil to forwardly move a movable rod with the movable core fixed at its rear end, thereby forwardly moving the output shaft through a pushing rod and causing a movable contact supported by the movable rod to get in touch with a fixed contact from the back to rotate the armature;

wherein the electromagnetic switch has the fixed contact and the movable contact arranged at an inner peripheral side of a brush holder and has the fixed core partitioning a contact chamber and a movable core chamber thereby providing a barrier to prevent contact powder scattered in said contact chamber from entering said movable core chamber, the movable core chamber located behind the contact chamber.

2. A coaxial starting motor according to claim 1, wherein the movable rod has an outer periphery at its front end side faced to an inner peripheral portion of a rear bracket of the a d.c. motor, the movable rod has a holding sleeve supported on its outer periphery to be movable, the movable contact is supported by the holding sleeve in an insulating manner, and the movable contact is urged by a pressing spring in a contacting direction.

* * * * *